(12) United States Patent
Sajadieh et al.

(10) Patent No.: US 9,252,853 B2
(45) Date of Patent: Feb. 2, 2016

(54) TECHNIQUES FOR BEAMFORMING TO MITIGATE MULTI-USER LEAKAGE AND INTERFERENCE

(71) Applicant: INTEL CORPORATION, Santa Clara, CA (US)

(72) Inventors: Masoud Sajadieh, Fremont, CA (US); Hooman Shirani-Mehr, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 96 days.

(21) Appl. No.: 14/128,614

(22) PCT Filed: Sep. 27, 2013

(86) PCT No.: PCT/US2013/062401
§ 371 (c)(1),
(2) Date: Dec. 22, 2013

(87) PCT Pub. No.: WO2014/158226
PCT Pub. Date: Oct. 2, 2014

(65) Prior Publication Data
US 2015/0200718 A1 Jul. 16, 2015

Related U.S. Application Data

(60) Provisional application No. 61/806,821, filed on Mar. 29, 2013.

(51) Int. Cl.
*H04B 7/02* (2006.01)
*H04L 1/02* (2006.01)
(Continued)

(52) U.S. Cl.
CPC ............... *H04B 7/0456* (2013.01); *H04B 1/56* (2013.01); *H04B 7/0417* (2013.01); *H04L 1/1864* (2013.01); *H04L 5/0048* (2013.01); *H04L 5/0051* (2013.01); *H04L 5/0057* (2013.01); *H04L 5/0073* (2013.01);
(Continued)

(58) Field of Classification Search
CPC ... H04B 7/0456; H04B 7/0417; H04W 24/00; H04W 24/10; H04W 36/0005; H04L 5/0053; H04L 5/0057; H04L 5/0073; H04L 5/0085
USPC .................................................. 375/267, 299
See application file for complete search history.

(56) References Cited

U.S. PATENT DOCUMENTS

2005/0286650 A1\* 12/2005 Han et al. ...................... 375/267
2009/0069054 A1    3/2009 Zangi et al.
(Continued)

OTHER PUBLICATIONS

International Search Report and Written Opinion received for PCT Patent Application No. PCT/US2013/062401, mailed Jan. 13, 2014, 12 pages.

*Primary Examiner* — Qutbuddin Ghulamali
(74) *Attorney, Agent, or Firm* — Kacvinsky Daisak Bluni PLLC

(57) ABSTRACT

Examples are disclosed for beamforming to mitigate multi-user leakage and interference. The examples include an evolved node B (eNB) receiving feedback from user equipment (UEs) to indicate strongest or highest channel gains for various beams included in a plurality of beam sets. A selection process or scheme may then be implemented to select individual beams for a UE that minimizes or reduces leakage caused by the UE's use of a given beam. Reducing leakage may reduce interference to other UEs using other beams. Other examples are described and claimed.

24 Claims, 11 Drawing Sheets

(51) Int. Cl.

| | |
|---|---|
| *H04B 7/04* | (2006.01) |
| *H04L 5/00* | (2006.01) |
| *H04B 1/56* | (2006.01) |
| *H04W 56/00* | (2009.01) |
| *H04W 76/02* | (2009.01) |
| *H04W 36/30* | (2009.01) |
| *H04W 24/00* | (2009.01) |
| *H04W 36/26* | (2009.01) |
| *H04W 48/18* | (2009.01) |
| *H04W 24/10* | (2009.01) |
| *H04W 36/00* | (2009.01) |
| *H04W 36/22* | (2009.01) |
| *H04L 1/18* | (2006.01) |
| *H04W 48/16* | (2009.01) |
| *H04W 36/08* | (2009.01) |
| *H04W 48/12* | (2009.01) |
| *H04W 88/08* | (2009.01) |

(52) U.S. Cl.
CPC ............ *H04L 5/0085* (2013.01); *H04W 24/00* (2013.01); *H04W 24/10* (2013.01); *H04W 36/0005* (2013.01); *H04W 36/22* (2013.01); *H04W 36/26* (2013.01); *H04W 36/30* (2013.01); *H04W 48/18* (2013.01); *H04W 56/001* (2013.01); *H04W 76/023* (2013.01); *H04L 5/0007* (2013.01); *H04W 36/08* (2013.01); *H04W 48/12* (2013.01); *H04W 48/16* (2013.01); *H04W 88/08* (2013.01); *Y02B 60/50* (2013.01)

(56) References Cited

U.S. PATENT DOCUMENTS

| | | | |
|---|---|---|---|
| 2009/0196272 A1* | 8/2009 | Tsutsui | ............ 370/342 |
| 2009/0322613 A1 | 12/2009 | Bala et al. | |
| 2011/0096738 A1 | 4/2011 | Choi | |
| 2013/0142271 A1* | 6/2013 | Nilsson et al. | ............ 375/267 |

* cited by examiner

*UE Feedback Gain Table 300*

|            | UE 1      | UE 2      | UE 3      | UE 4      | UE 5      |
|------------|-----------|-----------|-----------|-----------|-----------|
| Beam Set 0 | $g_{1,k_0}$ | $g_{2,l_0}$ | $g_{3,m_0}$ | $g_{4,n_0}$ | $g_{5,o_0}$ |
| Beam Set 1 | $g_{1,k_1}$ | $g_{2,l_1}$ | $g_{3,m_1}$ | $g_{4,n_1}$ | $g_{5,o_1}$ |
| Beam Set 2 | $g_{1,k_2}$ | $g_{2,l_2}$ | $g_{3,m_2}$ | $g_{4,n_2}$ | $g_{5,o_2}$ |
| Beam Set 3 | $g_{1,k_3}$ | $g_{2,l_3}$ | $g_{3,m_3}$ | $g_{4,n_3}$ | $g_{5,o_3}$ |

*FIG. 3*

*Selected UE Gain Table 400*

|                 | UE 1 | UE 2 | UE 3 | UE 4 |
|-----------------|------|------|------|------|
| Strongest       | $g_{1,k_1}$ | $g_{2,l_2}$ | $g_{3,m_1}$ | $g_{4,n_3}$ |
| •               | $g_{1,n_3}$ | $g_{2,m_1}$ | $g_{3,m_2}$ | $g_{4,n_2}$ |
| •               | $g_{1,k_0}$ | $g_{2,l_0}$ | $g_{3,n_3}$ | $g_{4,k_1}$ |
| Weaker          | $g_{1,l_2}$ | $g_{2,l_3}$ | $g_{3,m_0}$ | $g_{4,n_0}$ |
| Unmitigated SINR | $\dfrac{g_{1,k_1}^2}{g_{1,n_3}^2 + g_{1,l_2}^2}$ | $\dfrac{g_{2,l_2}^2}{g_{2,m_1}^2}$ | $\dfrac{g_{3,m_1}^2}{g_{3,n_3}^2}$ | $\dfrac{g_{4,n_3}^2}{g_{4,k_1}^2}$ |

*FIG. 4*

*Beam Selection Table 500*

|                | UE 1 | UE 2 | UE 3 | UE 4 |
|----------------|------|------|------|------|
| Strongest      | $g_{1,k_1}$ (rejected) | $g_{2,l_2}$ (selected) | $g_{3,m_1}$ (rejected) | $g_{4,n_3}$ (rejected) |
| •              | $g_{1,n_3}$ (selected) | $g_{2,m_1}$ | $g_{3,m_2}$ (selected) | $g_{4,n_2}$ (selected) |
| •              | $g_{1,k_0}$ | $g_{2,l_0}$ | $g_{3,n_3}$ | $g_{4,k_1}$ |
| Weaker         | $g_{1,l_2}$ | $g_{2,l_3}$ | $g_{3,m_0}$ | $g_{4,n_0}$ |
| Mitigated SINR | $\dfrac{g_{1,n_3}^2}{g_{1,l_2}^2 + N_0}$ | $\dfrac{g_{2,l_2}^2}{N_0}$ | $\dfrac{g_{3,m_1}^2}{N_0}$ | $\dfrac{g_{4,n_2}^2}{N_0}$ |

Interference Threshold (dashed line between row 3 and Weaker row)

*FIG. 5*

Storage Medium 800

*Computer Executable Instructions for 700*

FIG. 8

**Storage Medium *1100***

*Computer Executable Instructions for 1000*

*FIG. 11*

TECHNIQUES FOR BEAMFORMING TO MITIGATE MULTI-USER LEAKAGE AND INTERFERENCE

RELATED CASE

This application claims priority to U.S. Provisional Patent Application No. 61/806,821, filed on Mar. 29, 2013, incorporated by reference in its entirety.

TECHNICAL FIELD

Examples described herein are generally related to wireless communication devices.

BACKGROUND

Increasing demands on limited resources for wireless communication networks has led to innovative solutions such as multi-user and full-dimension multi-input and multiple-output (MU-MIMO and FD-MIMO) systems. FD-MIMO systems may include use of an antenna array at a base station that has many antennas to serve several users or user equipment (UE). A multi-user FD-MIMO system with an antenna array having many antennas has a potential to achieve higher spectral efficiency by co-scheduling a relatively large number of UEs at relatively high data or bit rates.

BRIEF DESCRIPTION OF THE DRAWINGS

FIG. 3 illustrates an example UE feedback gain table.
FIG. 4 illustrates an example selected UE gain table.
FIG. 5 illustrates an example beam selection table.
FIG. 8 illustrates an example of a first storage medium.
FIG. 11 illustrates an example of a second storage medium.

DETAILED DESCRIPTION

Figure 1:
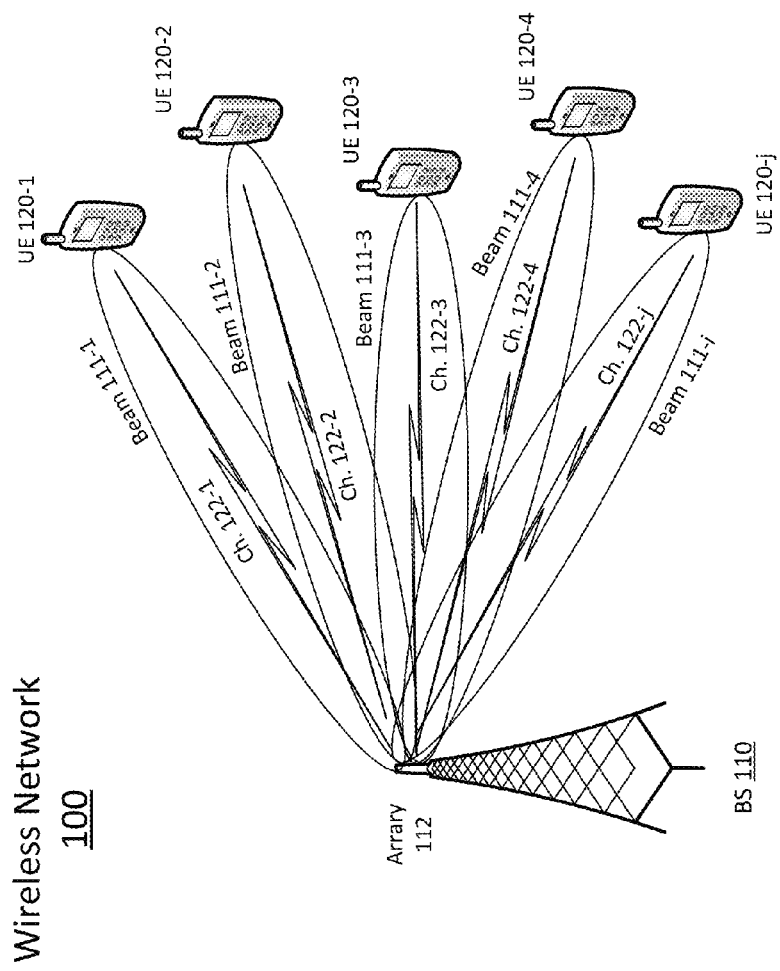
FIG. 1 illustrates an example of a wireless network.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP LTE and LTE-A standards, such as the 3GPP LTE Evolved UMTS Terrestrial Radio Access Network (E-UTRAN), Universal Terrestrial Radio Access (E-UTRA) and LTE-A Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 January 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, a multi-user FD-MIMO system with an antenna array having many antennas has a potential to achieve higher spectral efficiency by co-scheduling a relatively large number of UEs at relatively high data or bit rates. The co-scheduling of a relatively large number of UEs allows for a more efficient use of resources and the multiple antennas may be a key aspect of the high data or bit rates. Availability of channel state information (CSI) at a base station or evolved node B (eNB) capable of operating in compliance with one or more 3GPP LTE stands such LTE-A may be a crucial factor or element affecting achievable gains for a multi-user FD-MIMO systems. However, in some systems having UEs capable of operating incompliance with LTE-A, a single UE measures, quantizes and transmits CSI reports to the eNB. Further, channel quality indicators (CQIs) provided by the eNB may be obtained based on single-user MIMO codebooks and, as a result, may not indicate multi-user interference that inevitably occurs in multi-user FD-MIMO systems. A CQI-mismatch may occur and this may become a limiting factor in increasing the rank of co-scheduled users in multi-user FD-MIMO systems. Techniques such as CQI adjustment at the eNB have limited success especially for interference-limited scenarios.

In some examples, precoding weights associated with beamforming techniques may be generally calculated based on maximizing signal to interference and noise ratio (SINR). Precoding weights determined based on maximizing SINR may minimize or reduce aggregated interference coming from other sources such as separate beams utilized by other UEs. Alternatively, precoding weights may be determined based on maximizing signal to leakage and noise ratio (SLNR). Leakage from a UE's beam to other beams used by other UEs is a main focus of SLNR. Existing beamforming techniques rely exclusively on either SNIR or SLNR to determine precoding weights and lack flexibility in selecting the best beam for a given UE based on a combined interference and leakage view of the various UEs in a multi-user FD-MIMO system. It is with respect to these and other challenges that the examples described herein are needed. In some examples, techniques are implemented at a base station or eNB having a plurality of antennas. For these examples, the techniques may include grouping a plurality of beams in beam sets, each beam arranged to be transmitted from the plurality of antennas. The techniques may also include generating reference symbols for each beam set. Each beam set may then be activated by precoding each beam set using the separate reference symbol for each beam set. The reference symbols in an activated beam set may then be transmitted via the precoded beams. According to some examples, the techniques may also include receiving feedback from a plurality of UEs that indicates which beam from each beam set has a highest channel gain as detected by each of the plurality of UEs. A selection of a number of UEs from among the plurality of UEs may be made. The number of UEs selected may equal a total number of beam sets having the grouped beams. According to some examples, the techniques may also include selecting a beam from among the plurality of beams for a first selected UE. The beam may be selected based on the beam causing no interference to other beams from among the plurality of beams selected for other selected UEs that is above a given interference threshold.

FIG. 1 illustrates an example of a wireless network 100. In some examples, as shown in FIG. 1, wireless network 100 includes a base station (BS) 110 and user equipment (UE) 120-1 to 120-*j*, where j represents any whole integer greater than 4. Also shown in FIG. 1 is BS 110 having an array 112. According to some examples, array 112 may include a plurality of antennas capable of supporting a multi-user FD-MIMO system. As described in more detail below, logic and/or features at BS 110 may be capable of using array 112 to transmit beams 111-1 to 111-*i*, where i also represent any whole integer greater than 4. The logic and/or feature at BS 110 may be capable of implementing various beamforming techniques to direct beams 111-1 to 111-*i* towards UEs 120-1 to 120-*j*. For example, BS 110 may be capable of operating in compliance with one or more 3GPP LTE standards including LTE-A and beams 111-1 to 111-*i* may be transmitted or generated using an orthonormal precoding basis $\{\emptyset_i\}$ separately trained on locations possibly occupied by one of UEs 120-1 to 120-*j*.

In some examples, UEs 120-1 to 120-*j* may include logic and/or features capable of operating in compliance with one or more 3GPP LTE standards including LTE-A. For these examples, UEs 120-1 to 120-*j* may separately establish a communication channel (Ch.) over a beam transmitted from array 112 of BS 110. As shown in FIG. 1, Chs. 122-1, 122-2, 122-3, 122-4 and 122-*j* may be established over respective beams 111-1, 111-2, 111-3, 111-4 and 111-*j*.

According to some examples, logic and/or features at BS 110 may be capable of implementing a beamforming and/or beam selection technique that may mitigate or reduce multi-user leakage and/or interference. For example, beam 111-3 may be used by UE 120-3 to establish Ch. 112-3 with BS 110. However, beam 111-3 may cause some interference or some leakage to adjacent beams 111-2 and 111-4 used by respective UEs 120-2 and 120-4. All three UEs may provide feedback to BS 110 regarding channel characteristics such as channel gain observed for detected beams. The logic and/or features at BS 110 may then use the feedback from the multiple UEs to select a beam for UE 120-3 that may cause little to no leakage and/or interference. That selected beam may still be beam 111-3 or the selected beam may be another beam either shown or not shown in FIG. 1.

According to some examples, the logic and/or features at BS 110 may include system equipment, such as network equipment for a communications system or network compliant with one or more 3GPP LTE Specifications (e.g., LTE-A). For example, these base stations may be implemented as evolved Node B (eNB) base stations or remote radio heads for a Wireless LTE or LTE-A network. Although some examples are described with reference to a base station, eNB or remote radio head, embodiments may utilize any network equipment for a wireless network. The examples are not limited in this context.

According to some examples, UEs 120-1 120-*j* may be any electronic device having wireless capabilities or equipment. For some examples, UEs 120-1 to 120-*j* may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

Figure 2:
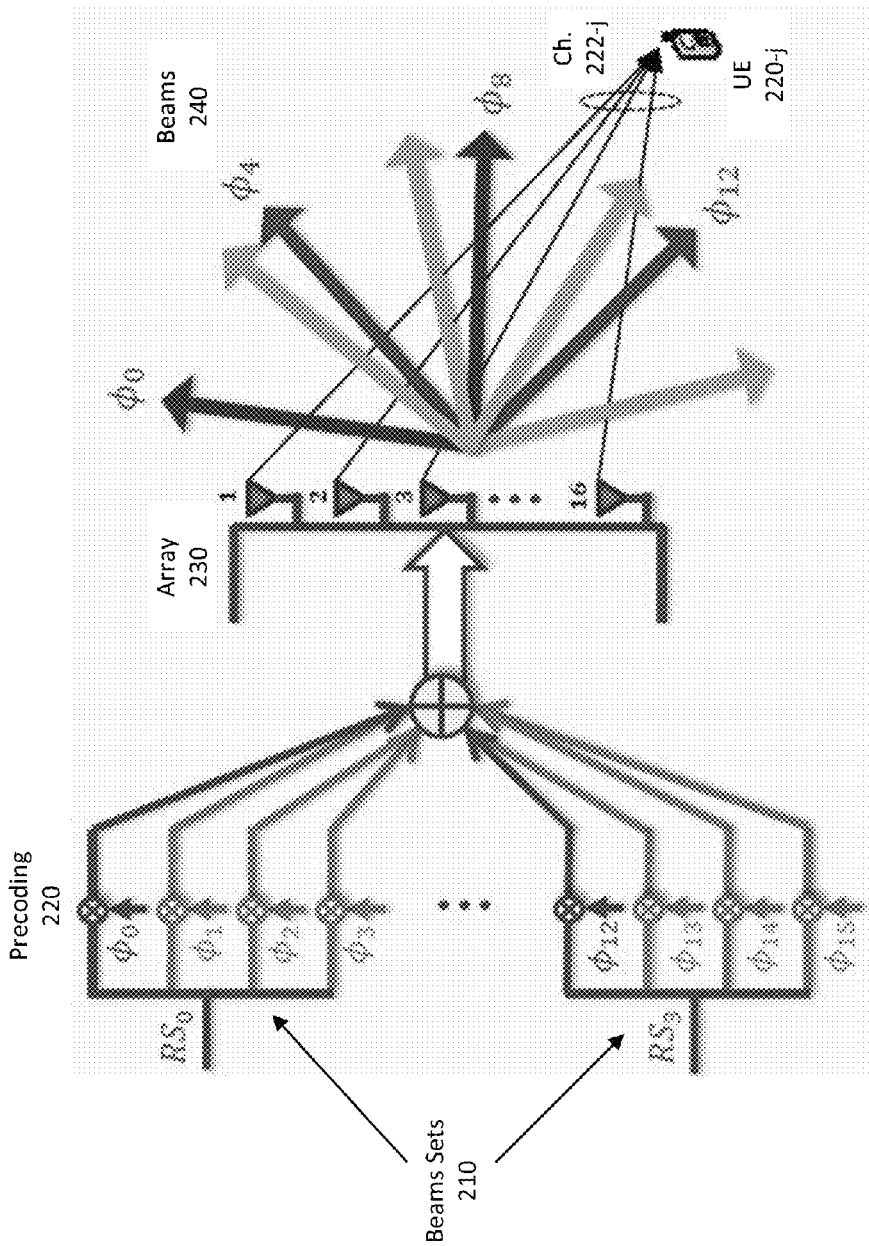
FIG. 2 illustrates an example system.

FIG. 2 illustrates an example system 200. According to some examples, system 200 depicts beamforming with beam partitioning or grouping to minimize cross-beam interference when transmitting reference symbols that may be used by UEs to determine channel gains. For these examples, beam sets 210 may include groups of individual beams 240 to be precoded at precoding 220 using reference symbols generated for each beam set and then transmitted via a plurality of antennas included in array 230. Beams 240 may then be transmitted toward a plurality of UEs such as UE 220-*j* for each UE to establish a separate communication channel with an eNB including system 200 such as Ch. 222-*j* for UE 220-*j*.

In some examples, in order to limit interference caused by activating all beams 240, beams 240 may be grouped into beam sets 210. For example, 4 beam sets may be grouped for 16 beams possibly transmitted from 16 antennas included in array 230. These 4 beam sets may be indexed by r=0, 1, 2, 3 as $\{\emptyset_r, \emptyset_{r+4} \emptyset r_{+8} \emptyset_{r+12}\}$.

According to some examples, system 200 may be located at a base station or eNB capable of operating in compliance with one or more 3GPP LTE standards including LTE-A. For these examples, reference symbols may be generated by logic and/or features at the eNB for each of the 4 indexed beams sets. The reference symbols for the 4 indexed beams sets may include $RS_0$, $RS_1$, $RS_2$, $RS_3$. Also, for these examples, each beam set may be iteratively activated according to index numbers by precoding each beam in each beam set using the reference symbols for each beam set over B consecutive sub-frames. For example, as shown in FIG. 2, beams $Ø_0$, $Ø_4$, $Ø_8$, $Ø_{12}$ of a beam set indexed for $r_0$ would be the first activated beam set using the generated reference symbols. Beams $Ø_3$, $Ø_7$, $Ø_{11}$, $Ø_{15}$ included in the beam set indexed for $r_3$ would be the last activated beam set using the generated reference symbols. Logic and/or features at the eNB may then cause each iteratively activated beam set to be transmitted by the 16 antennas of array 230 via the precoded beams included in each beam set.

In some examples, UEs such as UE 220-$j$ may be capable of providing feedback on a beam set basis. For example, UE 220-$j$ may include logic and/or features to determine which given beam of each beam set $r_0$, $r_1$, $r_2$ and $r_3$ has the best or highest channel gain and then report that information back to the eNB (e.g., in one or more CSI reports).

In some examples, a value of B may be determined based on system design or operating environment parameters/characteristics such as whether UEs in system 200 are moving, rate of movement of UEs, buildings, trees or large moving objects (e.g., trains) located in or around a cell serviced by an eNB. Examples are not limited to just the above mentioned operating environment parameters/characteristics.

FIG. 3 illustrates an example UE feedback gain table 300. In some examples, as shown in FIG. 3, UE feedback gain table 300 includes feedback information for beam sets 0 to 3 and UEs 1 to 5. For these examples, $g_{j,i_r} = |H_j Ø_{i_r}|$ may depict effective (pre-coded) channel gain of UE $j$ along direction of beam $i_r$:r=0, 1, 2, 3. For these examples, this may be a CQI for a particular beam that has the highest channel gain. Also, $i_r$ may index beam i which may be included in beam set r. So, for example, as shown in UE feedback table 300 for UE 3, beam $m_1$ may create the strongest or highest channel gain among beams in beam set 1.

According to some examples, the feedback information included in UE feedback gain table 300 may be obtained from measurements on reference symbols (e.g., $RS_0$, $RS_1$, $RS_2$, $RS_3$). These reference symbols may have been sent to the UEs in a similar manner as mentioned above for system 200 in FIG. 2.

FIG. 4 illustrates an example selected UE gain table 400. According to some examples, selected UE gain table 400 may indicate a ranking of strongest to weaker channel gains for selected UEs that have provided feedback based on measurements for received reference symbols (e.g., $RS_0$, $RS_1$, $RS_2$, $RS_3$) sent precoded by grouped beams in a similar manner as mentioned above for system 200 in FIG. 2. For these examples, 4 UEs have been selected to match or equal the number of 4 beam sets.

According to some examples, logic and/or features at an eNB may have selected UEs 1 to 4 from a pool of candidate UEs based on a proportional-fair scheduling (PFS) scheme. The pool of candidates may be those UEs that have provided feedback to the eNB. In other examples, UEs 1 to 4 may have been selected based on these UEs providing higher channel gains compared to non-selected UEs included in the pool of candidate UEs. Examples are not limited to only these two methods of selection. Other selection methods are contemplated.

In some examples, logic and/or features at an eNB may create selected UE gain table 400 to have rows arranged such that strongest channel gain for each UE is included in the first row and weaker channel gains are located in the second, third and fourth rows, respectively. For these examples, the bolded text indicates those beams having the strongest channel gains for UEs 1 to 4. Also, the shaded blocks of selected UE gain table 400 indicate other beams detected by a given UE that were indicated by other UEs as having their strongest channel gain. Thus, for UE 1, unmitigated SNIR for UE 1 may need to account for possible interference or leakage from UE 2's use of $Ø l_2$ and UE 4's use of $Ø n_3$. For UE 2, unmitigated SNIR may need to account for possible interference or leakage from UE 3's use of $Ø m_3$. For UE 3, unmitigated SNIR may need to account for possible interference or leakage from UE 4's use of $Ø m_1$. For UE 4, unmitigated SNIR may need to account for possible interference or leakage from UE 1's use of $Ø k_1$.

FIG. 5 illustrates an example beam selection table 500. According to some examples, logic and/or features at an eNB may be capable of using beam selection table 500 to select beams for use by UEs 1 to 4 that allow for a mitigation of interference and leakage. For these examples, the logic and/or features at the eNB may use a rule that may remove occurrences of leakage at second or third rows of beam selection table 500 to arrive at a given selected beam. For example, the logic and/or features at the eNB may reject the use of $Ø k_1$ for UE 1 due to leakage to UE 4 at the third row of beam selection table 500. Also, $Ø m_1$ for UE 3 is rejected due to leakage to UE 2 at the second row of beam selection table 500. Also, $Ø n_3$ for UE 4 is rejected due to leakage to UE 1 at the second row of beam selection table 500. For each of these rejections, interference caused by this leakage at the $2^{nd}$ and $3^{rd}$ rows of beam selection table 500 may by above a given interference threshold depicted in FIG. 5 as the dashed-line between the third and fourth rows.

According to some examples, $Ø l_2$ for UE2 may still be selected even though this beam has some leakage to UE 1. However, in some examples, the amount of leakage to UE 1 may be low or negligible due to the fourth row having the weaker channel gain for UE 1. As shown in FIG. 5, that weaker channel gain for $Ø l_2$ is below an interference threshold. Also, as shown in FIG. 5, $Ø n_3$, $Ø m_1$, and $Ø m_1$ are selected for UEs 1, 2 and 3, respectively because all three of these beams do not cause at least detectable leakage to any other UEs selected beams in at least the second or third rows of beam selection table 500.

In some examples, logic and/or features at the eNB may set precoding weights based on which beam was selected for each of UEs 1 to 4. Data may then be forwarded to respective UEs that include precoding weights for each UEs selected beam. For example, data including precoding weights based on selection of $Ø m_1$ may be forwarded to UE 2. Logic and/or features at UE 2 may then be capable of using the precoding weights to receive data via $Ø m_1$.

This disclosure is not limited to gain tables or beam selection tables having four rows associated with four beam sets. Other rules may be implemented that may include more or less rows above/below an interference threshold via which selection of a beam may be determined. For example, if 10 beam sets and 10 selected UEs were included in a gain table, the other rules may move the interference threshold to below the fifth row and thus reject beams if leakage is indicated in a selected UE gain table at second, third, fourth or fifth rows.

According to some examples, an amount of feedback possibly needed for UEs to report back strongest channel gains for beam sets may place a burden on at least some UEs and an eNB that processes received feedback. A feedback reduction scheme may be implemented that may require feedback only if a channel gain was measured that was above a given threshold strength. In other words, no reporting mechanism is triggered for a UE if all beams in a given beam set do not have at least one measured channel gain that is above the given threshold strength. This may be beneficial to UEs located in areas not targeted for certain beams or at the edge a targeted area.

Figure 6:
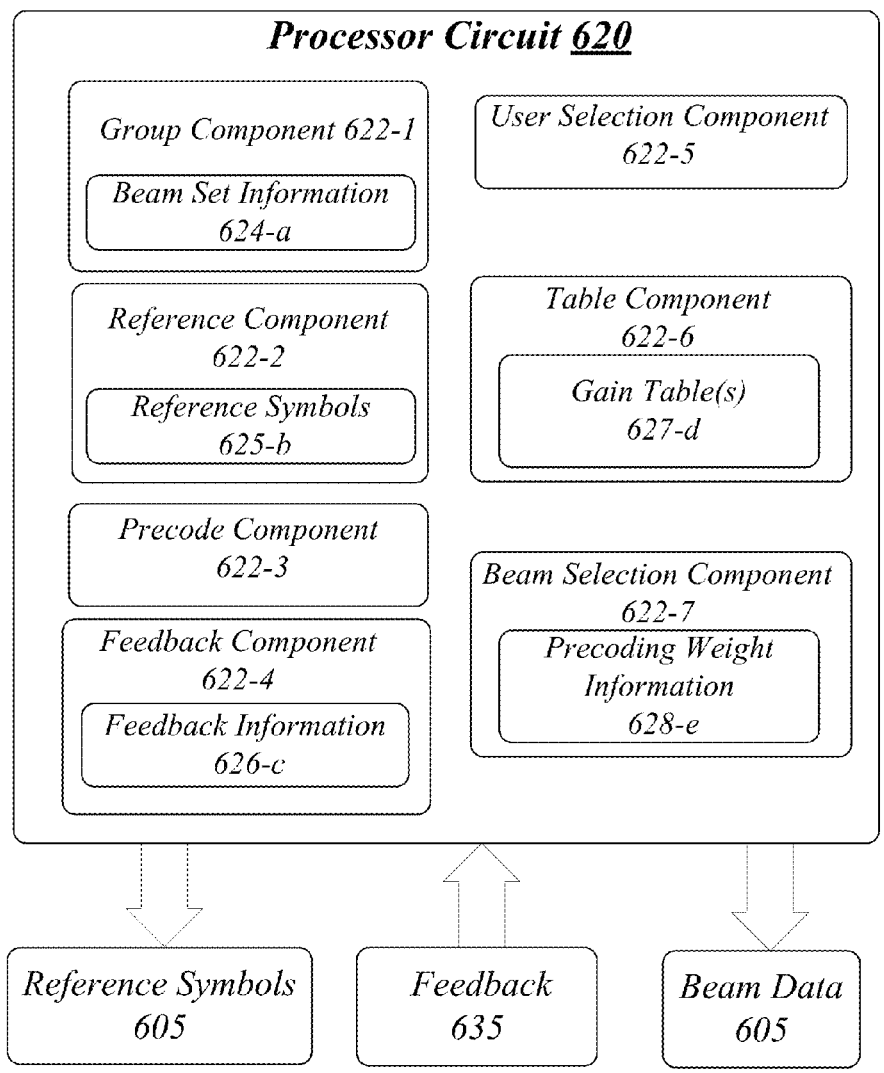
FIG. 6 illustrates an example block diagram for a first apparatus.

FIG. 6 illustrates a block diagram for an example first apparatus. As shown in FIG. 6, the example first apparatus includes apparatus 600. Although apparatus 600 shown in FIG. 6 has a limited number of elements in a certain topology, it may be appreciated that the apparatus 600 may include more or less elements in alternate topologies as desired for a given implementation. The apparatus 600 may comprise a computer-implemented apparatus 600 having a processor circuit 620 arranged to execute one or more software components 622-a. It is worthy to note that "a" and "b" and "c" and similar designators as used herein are intended to be variables representing any positive integer. Thus, for example, if an implementation sets a value for a=7, then a complete set of software components 622-a may include components 622-1, 622-2, 622-3, 622-4, 622-5, 622-6 and 622-7. The examples are not limited in this context.

According to some examples, apparatus 600 may be located with system equipment (e.g., located at or with BS 110), such as network equipment for a communications system or network compliant with one or more 3GPP LTE Specifications. For example, apparatus 600 may be implemented as part of a base station or eNB for an LTE and/or LTE-A compliant wireless network. Although some examples are described with reference to a base station or eNB, examples may utilize any network equipment for a communications system or network. The examples are not limited in this context.

In some examples, as shown in FIG. 6, apparatus 600 includes processor circuit 620. Processor circuit 620 may be generally arranged to execute one or more software components 622-a. The processing circuit 620 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 620. According to some examples, processor circuit 620 may also be an application specific integrated circuit (ASIC) and at least some components 622-a may be implemented as hardware elements of the ASIC.

According to some examples, apparatus 600 may include a group component 622-1. Group component 622-1 may be executed by processor circuit 620 to group a plurality of beams in beam sets. In some examples, each beam may be arranged to be transmitted from a plurality of antennas located at or with an eNB including apparatus 600. Group component 622-1 may at least temporarily maintain beam set information 624-a in a data structure such as a lookup table (LUT). For example, an eNB capable of supporting a system similar to system 200 described above for FIG. 2 may group 16 beams arranged to be transmitted from 16 antennas. The 16 beams, for example, may be grouped into 4 beam sets and information associated with that grouping may be included in beam set information 624-a.

In some examples, apparatus 600 may also include a reference component 622-2. Reference component 622-2 may be executed by processor circuit 620 to generate reference symbols for each beam set. For these examples, reference component 622-2 may at least temporarily maintain generated reference symbols in reference symbols 625-b. Reference symbols 625-b may be maintained in a data structure such as a LUT.

In some examples, apparatus 600 may also include a precode component 622-3. Precode component 622-3 may be executed by processor circuit 620 to activate each beam set by precoding each beam in each beam set using the reference symbol for each beam set. Precode component 622-3 may also cause the reference symbols in an activated beam set to be transmitted via the precoded beams. For these examples, the reference symbols may be included in reference symbols 605. Reference symbols 605 may be transmitted towards one or more UEs in possible communication with the eNB including apparatus 600.

According to some examples, apparatus 600 may also include a feedback component 622-4. Feedback component 622-4 may be executed by processor circuit 620 to receive feedback from a plurality of UEs that indicates which beam from each beam set has a highest channel gain as detected by each of the plurality of UEs. For these examples, feedback component 622-4 may be capable of gathering the received feedback included in feedback 635 and at least temporarily maintaining that feedback with feedback information 626-c. Feedback information 626-c may be maintained in a data structure such as a LUT.

In some examples, apparatus 600 may also include a user selection component 622-5. User selection component 622-5 may be executed by processor circuit 620 to select a number of UEs. The number of UEs selected by selection component 622-5 may equal a total number of beam sets having the grouped beams.

In some examples, apparatus 600 may also include a table component 622-6. Table component 622-6 may be executed by processor circuit 620 to create gain table(s) having three or more rows to indicate strongest to weakest channel gains reported by respective selected UEs indicated in each column of the gain table. The first row may indicate strongest channel gain. For these examples, table component 622-6 may be capable of accessing feedback information 626-c maintained by feedback component 622-4 to create the gain table(s). The created gain tables may be at least temporarily maintained (e.g., in a LUT) by table component 622-6 with gain table(s) 627-d, According to some examples, apparatus 600 may also include a beam selection component 622-7. Beam selection component 622-7 may be executed by processor circuit 620 to select a beam from among the plurality of beams for a first selected UE based on the beam causing no interference to other beams from among the plurality of beams selected for other selected UEs that is above a given interference threshold. Beam selection component 622-7 may forward data to the first selected UE that includes precoding weights set based on the selected beam. For these examples, beam selection component 622-7 may use gain table(s) 627-d to select the beam. Selection of the beam may also including rejecting other beams having a strongest channel gain for a given selected UE based on the strongest channel gain beam included in a second or third row of the created gain table(s) for any of the other selected UEs indicating interference above the given interference threshold. Beam selection component 622-7 may at least temporarily maintain set precoding weights with precoding weight information 628-e, (e.g., in a LUT). According to some examples, beam selection component 622-7 may forward the data to the first selected UE via beam data 605 that includes the precoded weights for this UE's selected beam. Various components of apparatus 600 and a device implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 7:
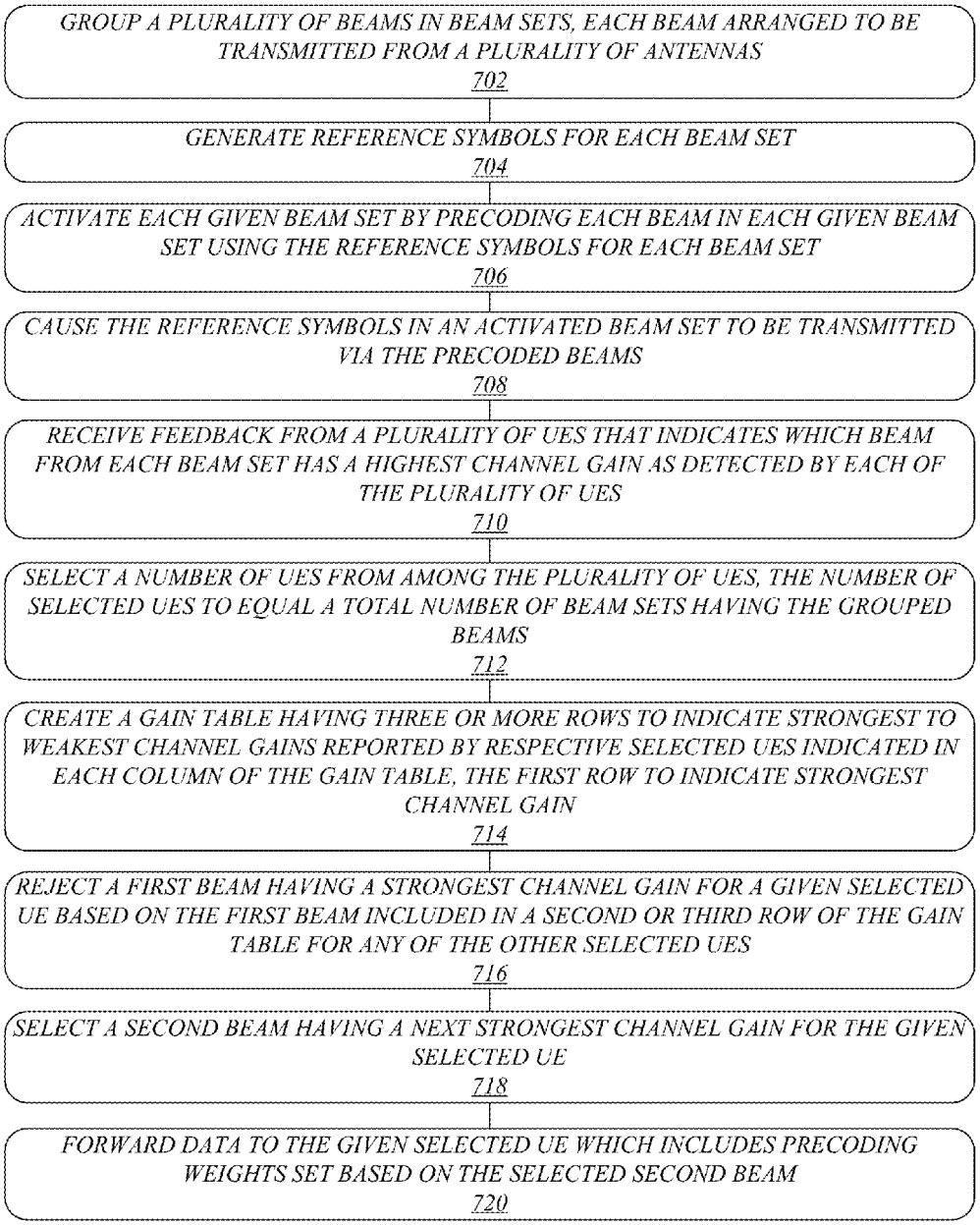
FIG. 7 illustrates an example of a first logic flow.

FIG. 7 illustrates an example of a logic flow 700. Logic flow 700 may be representative of some or all of the operations executed by one or more logic, features, or devices described herein, such as apparatus 600. More particularly, logic flow 700 may be implemented by group component 622-1, reference component 622-2, precode component 622-3, feedback component 622-4, user selection component 622-5, table component 622-6 or beam selection component 622-7.

In the illustrated example shown in FIG. 7, logic flow 700 at block 702 may group a plurality of beams in beam sets, each beam arranged to be transmitted from a plurality of antennas. In some examples, group component 622-1 may be capable of grouping the beam sets.

According to some examples, logic flow 700 at block 704 may generate reference symbols for each beam set. For these examples, reference component 622-2 may be capable of generating the reference symbols for each beam set.

In some examples, logic flow 700 at block 706 may activate each beam set by precoding each beam in each beam set using the reference symbols for each beam set. For these examples, precode component 622-3 may be capable of activating each beam in each beam set.

According to some examples, logic flow 700 at block 708 may cause the reference symbols in an activated beam set to be transmitted via the precoded beams. For these examples, precode component 622-3 may be capable of causing the reference symbols to be transmitted via the precoded beams.

In some examples, logic flow 700 at block 710 may receive feedback from a plurality of UEs that indicates which beam from each beam set has a highest channel gain as detected by each of the plurality of UEs. For these examples, feedback component 622-4 may receive the feedback. According to some examples, logic flow 700 at block 712 may select a number of UEs from among the plurality of UEs. The number of selected UEs may equal a total number of beam sets having the grouped beams. For these examples, user selection component 622-5 may be capable of selecting the number of UEs.

In some examples, logic flow 700 at block 714 may create a gain table having three or more rows to indicate strongest to weakest channel gains reported by respective selected UEs indicated in each column of the gain table, the first row to indicate strongest channel gain. For these examples, table component 622-6 may be capable of creating the gain table.

According to some examples, logic flow 700 at block 716 may reject a first beam having a strongest channel gain for a given selected UE based on the first beam included in a second or third row of the gain table for any of the other selected UEs. For these examples, beam selection component 622-7 may be capable of rejecting the first beam.

In some examples, logic flow 700 at block 718 may select a second beam having a next strongest channel gain for the given selected UE. For these examples, beam selection component 622-7 may also be capable of selecting the second beam.

According to some examples, logic flow 700 at block 720 may forward data to the given selected UE which includes precoding weights set based on the selected second beam. For these examples, beam selection component may also be capable of forwarding the data to the given selected UE.

FIG. 8 illustrates an embodiment of a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
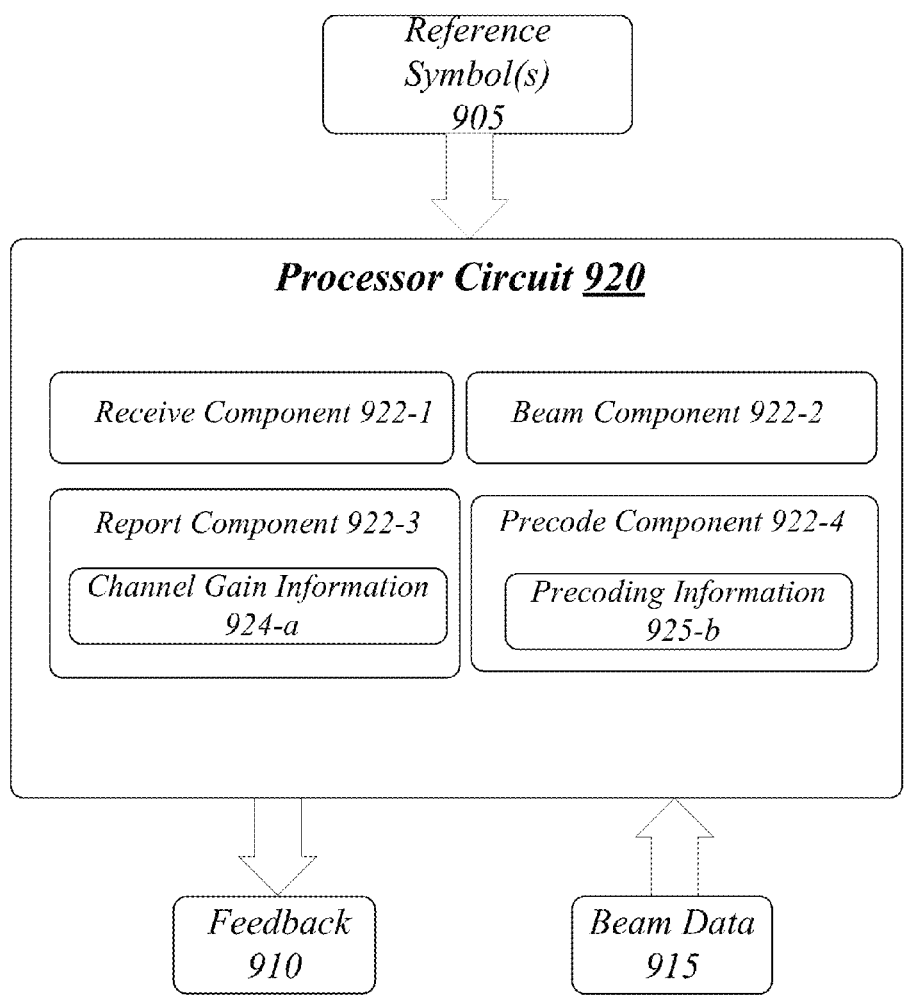
FIG. 9 illustrates an example block diagram for a second apparatus.

FIG. 9 illustrates a block diagram for an example second apparatus. As shown in FIG. 9, the example second apparatus includes apparatus 900. Although apparatus 900 shown in FIG. 9 has a limited number of elements in a certain topology, it may be appreciated that the apparatus 900 may include more or less elements in alternate topologies as desired for a given implementation. The apparatus 900 may comprise a computer-implemented apparatus 900 having a processor circuit 920 arranged to execute one or more software components 922-a. It is worthy to note that "a" and "b" and "c" and similar designators as used herein are intended to be variables representing any positive integer. Thus, for example, if an implementation sets a value for a=4, then a complete set of software components 922-a may include components 922-1, 922-2, 922-3 and 922-4. The examples are not limited in this context.

According to some examples, apparatus 900 may be located with user equipment (e.g., located at or with UEs 120-1 to 120-j) capable of operating in compliance with one or more 3GPP LTE Specifications. For example, apparatus 900 may be capable of communicatively coupling to an LTE and/or LTE-A compliant wireless network via one or more eNBs. The examples are not limited in this context.

In some examples, as shown in FIG. 9, apparatus 900 includes processor circuit 920. Processor circuit 920 may be generally arranged to execute one or more software components 922-a. The processing circuit 920 can be any of various commercially available processors to included, but not limited to the processors mentioned above for apparatus 600. Also, according to some examples, processor circuit 920 may also be an ASIC and at least some components 922-a may be implemented as hardware elements of the ASIC.

According to some examples, apparatus 900 may include a receive component 922-1. Receive component 922-1 may be executed by processor circuit 920 to receive a plurality of reference symbols transmitted from an eNB. Each received reference symbol may have been precoded by the eNB and separately transmitted through a plurality of antennas via separate beams, each beam associated with one of a plurality of beam sets. For these examples, the received reference symbols may have been included in reference symbol(s) 905.

In some examples, apparatus 900 may also include a beam component 922-2. Beam component 922-2 may be executed by processor circuit 920 to determine which beam has highest channel gain for each beam set.

In some examples, apparatus 900 may also include a report component 922-3. Report component 922-3 may be executed by processor circuit 920 to report information to the ENB to indicate respective highest channel gain beams for each beam set. For these examples, report component 922-3 may be capable of maintaining channel gain information 924-a (e.g., in a LUT) that includes the highest channel gain beams as determined by beam component 922-2 and provide feedback 910 using channel gain information 924-a. According to some examples, report component 922-3 may determine whether beams have channel gains above a threshold reporting limit. If not above the threshold reporting limit, report component 922-3 may abstain from submitting a report for those particular beams having channel gains below the threshold reporting limit.

In some examples, apparatus 900 may also include a precode component 922-4. Precode component 922-4 may be executed by processor circuit 920 to use precoding weights received in data from the eNB. The precoding weights may have been set based on a given beam selected by the eNB based the reported highest channel gain beams reported by report component 922-3. For these examples, the precoding weights may have been received via beam data 915. Precode component 922-4 may maintain precoding information 925-b (e.g., in a LUT) that includes the precoding weights. Apparatus 900 may then use the precoding weights to receive data via the given beam.

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 10:
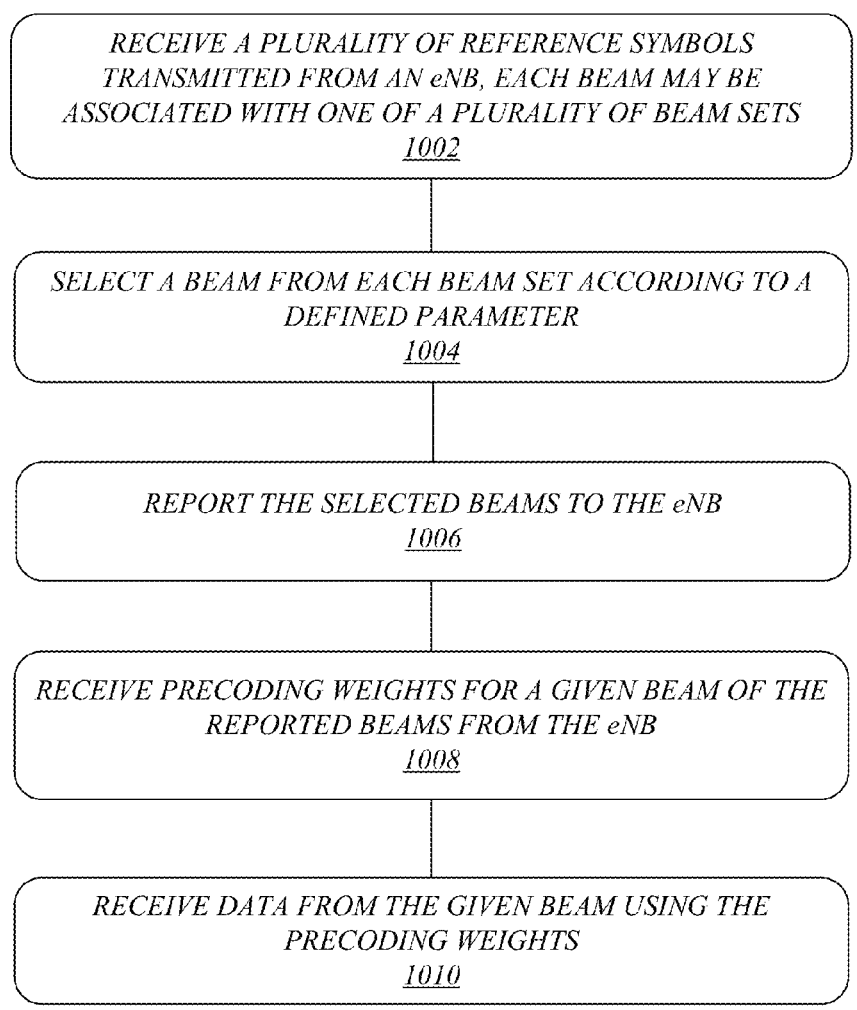
FIG. 10 illustrates an example of a second logic flow.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by receive component 922-1, beam component 922-2, report component 922-3 or precode component 922-4.

In the illustrated example shown in FIG. 10, logic flow 1000 at block 1002 may receive a plurality of reference symbols transmitted from an eNB via separate beams. Each beam may be associated with one of a plurality of beam sets. In some examples, receive component 922-1 may receive the reference symbols transmitted from the eNB.

According to some examples, logic flow 1000 at block 1004 may select a beam from each beam set according to a defined parameter. For these examples, beam component 922-2 may determine the highest channel gain for each beam set and then select the beam from each beam set having the highest channel gain.

In some examples logic flow 1000 at block 1006 may report the selected beams to the eNB. For these examples report component 922-3 may report the selected beams to the eNB. That report may include information to indicate respective highest channel gain for each of the selected beams.

According to some examples logic flow 1000 at block 1008 may receive precoding weights for a given beam of the reported beams from the eNB. For these examples, receive component 922-1 may receive the precoding weights from the eNB.

In some examples logic flow 1000 at block 1010 may receive data from the given beam using the precoding weights. For these examples precode component 922-4 may be capable of using the precoding weights to receive data from the given beam.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
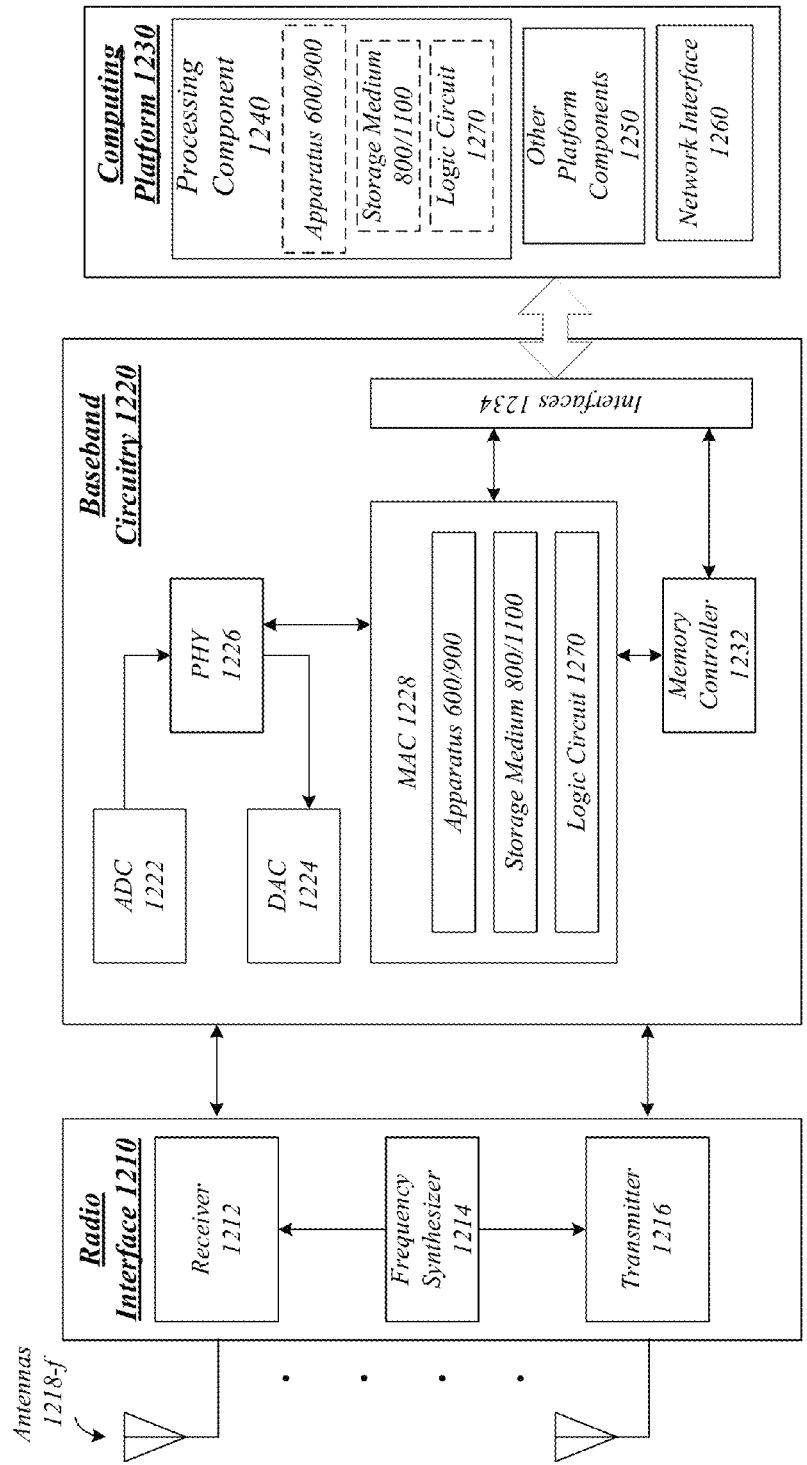
FIG. 12 illustrates an example of a device.

FIG. 12 illustrates an embodiment of a device 1200 for use in a broadband wireless access network. Device 1200 may implement, for example, apparatus 600, storage medium 1000 and/or a logic circuit 1270. The logic circuit 1270 may include physical circuits to perform operations described for apparatus 600 or apparatus 900. As shown in FIG. 12, device 1200 may include a radio interface 1210, baseband circuitry 1220, and computing platform 1230, although examples are not limited to this configuration.

The device 1200 may implement some or all of the structure and/or operations for the apparatus 600/900, storage medium 800/1100 and/or logic circuit 1270 in a single computing entity, such as entirely within a single device. Alternatively, the device 1200 may distribute portions of the structure and/or operations for apparatus 600/900, storage medium 800/1100 and/or logic circuit 1270 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218-$f$. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with MAC processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames (e.g., containing subframes). Alternatively or in addition, MAC processing circuit 1228 may share processing for certain of these functions or perform these processes independent of PHY processing circuit 1226. In some embodiments, MAC and PHY processing may be integrated into a single circuit.

Computing platform 1230 may provide computing functionality for device 1200. As shown, computing platform 1230 may include a processing component 1240. In addition to, or alternatively of, baseband circuitry 1220 of device 1200 may execute processing operations or logic for apparatus 600/900, storage medium 800/1100, and logic circuit 1270 using the processing component 1230. Processing component 1240 (and/or PHY 1226 and/or MAC 1228) may comprise various hardware elements, software elements, or a combination of both. Examples of hardware elements may include devices, logic devices, components, processors, microprocessors, circuits, processor circuits (e.g., processor circuit 620 or 920), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1230 may further include a network interface 1260. In some examples, network interface 1260 may include logic and/or features to support an X2 interface as described in one or more 3GPP LTE or LTE-A specifications or standards. For these examples, network interface 1260 may enable an apparatus 600 located at a base station to communicatively couple to one or more other base stations via an X2 communication channel. In some other examples, network interface 1260 may include logic and/or features to support other communication interface described in the one or more 3GPP LTE or LTE-A specifications. For these examples, network interface 1260 may enable an apparatus 900 located with a UE or an apparatus 600 located with a base station to communicatively couple to one or more other base stations via a wireless communications link.

Device 1200 may be, for example, user equipment, a computer, a personal computer (PC), a desktop computer, a laptop computer, an ultrabook computer, a smartphone, a tablet computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, evolved node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1200 may be implemented using single input single output (SISO) architectures. However, certain implementations may include multiple antennas (e.g., antennas 1218-f) for transmission and/or reception using adaptive antenna techniques for beamforming or spatial division multiple access (SDMA) and/or using multiple input multiple output (MIMO) communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
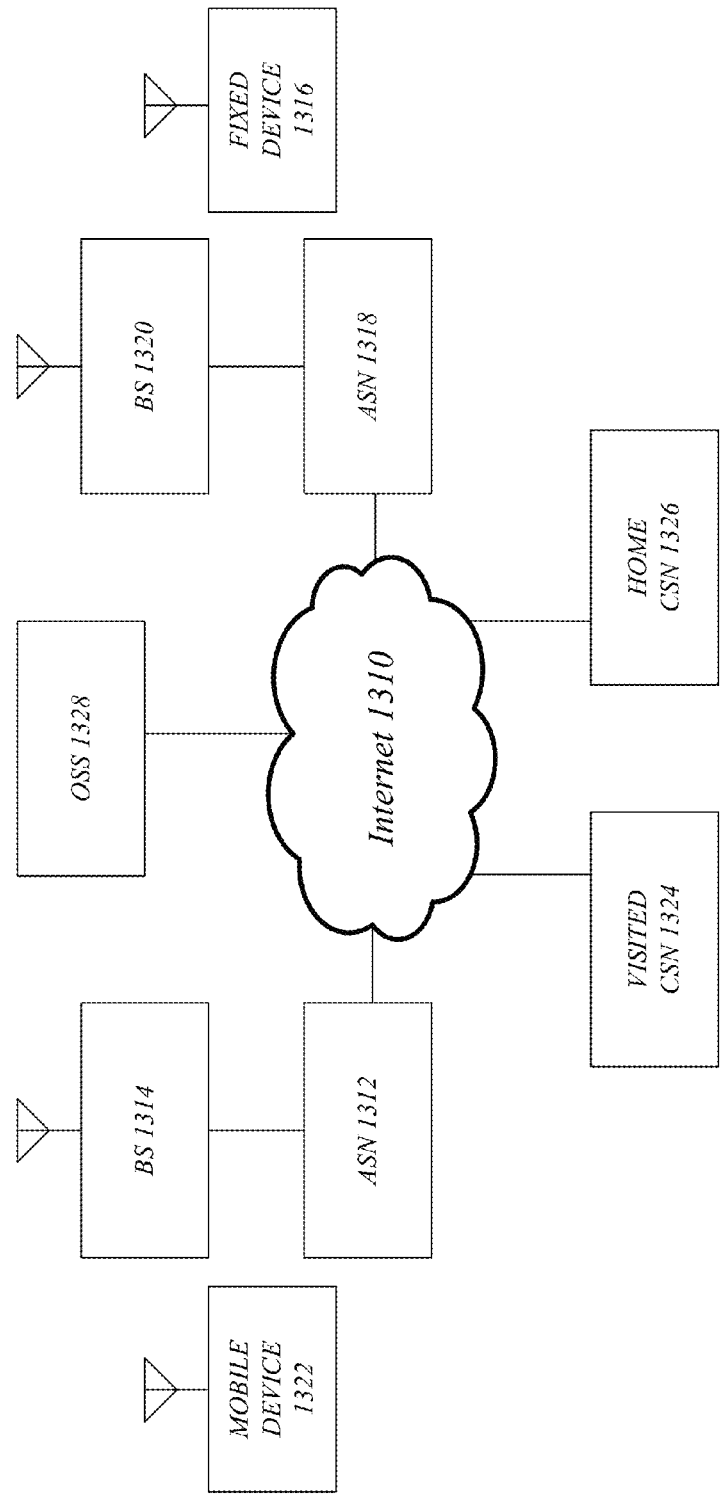
FIG. 13 illustrates an example of a broadband wireless access system.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1300, access service networks (ASN) 1314, 1318 are capable of coupling with base stations (BS) 1314, 1320 (RRHs or eNBs), respectively, to provide wireless communication between one or more fixed devices 1316 and internet 1310, or one or more mobile devices 1322 and Internet 1310. One example of a fixed device 1316 and a mobile device 1322 is UE 120-1, with the fixed device 1316 comprising a stationary version of UE 120-1 and the mobile device 1322 comprising a mobile version of UE 120-1. ASN 1312 may implement profiles that are capable of defining the mapping of network functions to one or more physical entities on broadband wireless access system 1300. Base stations 1314, 1320 (or eNBs) may comprise radio equipment to provide RF communication with fixed device 1316 and mobile device 1322, such as described with reference to device 1300, and may comprise, for example, the PHY, MAC, RLC or PDCP layer equipment in compliance with a 3GPP LTE Specification or an IEEE 802.16 Standard. Base stations 1314, 1320 (or eNBs) may further comprise an IP backplane to couple to Internet 1310 via ASN 1312, 1318, respectively, although the scope of the claimed subject matter is not limited in these respects.

Broadband wireless access system 1300 may further comprise a visited connectivity service network (CSN) 1324 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1324 or home CSN 1326, and the scope of the claimed subject matter is not limited in these respects. Visited CSN 1324 may be referred to as a visited CSN in the case where visited CSN 1324 is not part of the regular service provider of fixed device 1316 or mobile device 1322, for example where fixed 1316 or mobile device 1322 is roaming away from their respective home CSN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322.

Fixed device 1316 may be located anywhere within range of one or both base stations 1314, 1320, such as in or near a home or business to provide home or business customer broadband access to Internet 1310 via base stations 1314, 1320 and ASN 1312, 1318, respectively, and home CSN 1326. It is worthy to note that although fixed device 1316 is generally disposed in a stationary location, it may be moved to different locations as needed. Mobile device 1322 may be utilized at one or more locations if mobile device 1322 is within range of one or both base stations 1314, 1320, for example.

In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects. Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, an example first at least one machine readable medium may include a plurality of instructions that in response to being executed on a system for an UE capable of operating in compliance with one or more 3GPP LTE standards including LTE-A may cause the system to receive a plurality of reference symbols from an evolved node B (eNB) via separate beams. Each beam may be associated with one of a plurality of beam sets The instructions may also cause the system to select a beam from each beam set according to a defined parameter. The instructions may also cause the system to report the selected beams to the eNB. The instructions may also cause the system to receive precoding weights for a given beam of the reported beams from the eNB. The instructions may also cause the system to receive data from the given beam using the precoding weights According to some examples for the first at least one machine readable medium, the instructions may also cause the system to select the beam from each beam set based on the defined parameter comprising a highest channel gain.

In some examples for the first at least one machine readable medium, the given beam may be selected from among the plurality of beams based on the given beam causing no interference to other beams from among the plurality of beams selected for other UEs that is above a given interference threshold.

According to some examples for the first at least one machine readable medium, the instructions to also cause the system to report the selected beam to the eNB via transmission of a CSI report. In some examples for the first at least one machine readable medium, the plurality of antennas included in a multi-user, FD-MIMO system supported by the eNB.

In some examples, an example first apparatus may include a processor circuit for an UE capable of operating in compliance with one or more 3GPP LTE standards including LTE-Advanced (LTE-A). The first apparatus also including a receive component for execution by the processor circuit to receive a plurality of reference symbols transmitted from an eNB. Each received reference symbol may be precoded by the eNB and transmitted through a plurality of antennas via separate beams. Each beam may be associated with one of a plurality of beam sets. The first apparatus also including a beam component for execution by the processor circuit to determine which beam has highest channel gain for each beam set. The first apparatus also including a report component for execution by the processor circuit to report information to the eNB to indicate respective highest channel gain beams for each beam set. The first apparatus also including the receive component to receive data including precoding weights set based on a given beam selected by the eNB based on the reported highest channel gain beams. The first apparatus also including a precode component for execution by the processor circuit to use the precoding weights to receive data via the given beam.

According to some examples for the first apparatus, the given beam may be selected from among the plurality of beams based on the given beam causing no interference to other beams from among the plurality of beams selected for other UEs that is above a given interference threshold. In some examples for the first apparatus, the report component may report information to the eNB by causing transmission of a CSI report to the eNB.

According to some examples for the first apparatus, the plurality of antennas may be included in a multi-user, FD-MIMO system supported by the eNB.

In some examples, the first apparatus may also include a digital display coupled to the processor circuit to present a user interface view.

In some examples, example first methods may include receiving, at an UE capable of operating in compliance with one or more 3GPP LTE standards including LTE-A, a plurality of reference symbols transmitted from an eNB. Each received reference symbol may be precoded by the eNB and transmitted through a plurality of antennas via separate beams. Each beam may be associated with one of a plurality of beam sets. The first methods may also include determining which beam has highest channel gain for each beam set, reporting information to the eNB to indicate respective highest channel gain beams for each beam set and receiving data including precoding weights set based on a given beam selected by the eNB based on the reported highest channel gain beams. The first methods may also include using the precoding weights to receive data via the given beam.

According to some examples for the first methods, the given beam selected from among the plurality of beams based on the given beam causing no interference to other beams from among the plurality of beams selected for other UEs that is above a given interference threshold.

In some examples, the first methods may include reporting information to the eNB via transmission of a CSI report.

According to some examples for the first methods, the plurality of antennas included in a multi-user, FD-MIMO system supported by the eNB.

In some examples, a machine readable medium comprising a plurality of instructions that in response to being executed on a computing device may cause the computing device to carry out a computer-implemented method according to any one of the example first methods.

According some examples, an apparatus may include means for performing the computer-implemented methods of any one of the example first methods.

In some examples, an example second apparatus may include a processor circuit for an eNB capable of operating in compliance with one or more 3GPP LTE standards including LTE-A. The eNB may have a plurality of antennas. The second apparatus may also include a group component for execution by the processor circuit to group a plurality of beams in beam sets. Each beam may be arranged to be transmitted from the plurality of antennas. The second apparatus may also include a reference component for execution by the processor circuit to generate reference symbols for each beam set. The second apparatus may also include a precode component for execution by the processor circuit to activate each beam set by precoding each beam in each beam set using the reference symbols for each beam set and cause the reference symbols in an activated beam set to be transmitted via the precoded beams. The second apparatus may also include a feedback component for execution by the processor circuit to receive feedback from a plurality of user equipment (UEs) that indicates which beam from each beam set has a highest channel gain as detected by each of the plurality of UEs. The second apparatus may also include a user selection component for execution by the processor circuit to select a number of UEs from among the plurality of UEs, the number of selected UEs to equal a total number of beam sets having the grouped beams. The second apparatus may also include a beam selection component for execution by the processor circuit to select a beam from among the plurality of beams for a first selected UE based on the beam causing no interference to other beams from among the plurality of beams selected for other selected UEs that is above a given interference threshold. The beam selection component may forward data to the first selected UE that includes precoding weights set based on the selected beam.

According to some examples, the second apparatus may also include a table component for execution by the processor circuit to create a gain table having three or more rows to indicate strongest to weakest channel gains reported by respective selected UEs indicated in each column of the gain table, the first row to indicate strongest channel gain. For these examples, the beam selection component may reject individual beams having a strongest channel gain for a given selected UE based on the strongest channel gain beam included in a second or third row of the gain table for any of the other selected UEs indicating interference above the given interference threshold.

In some examples for the second apparatus, the rejected strongest channel gain beam may be included in the second or third row of the gain table for any of the other selected UEs to indicate the rejected strongest channel gain beam causes signal leakage that interferes with strongest channel gain beams for the other selected UEs.

According to some examples for the second apparatus, the group component may assign sequential index identifiers to each beam set and the precode component may iteratively activate each beam set according to assigned sequential identifiers.

In some examples for the second apparatus, the plurality of antennas included in a multi-user, FD-MIMO system supported by the eNB.

According to some examples for the second apparatus, the precode component may activate each beam set over a given number of consecutive sub-frames. The given number may be based on a system design or at least one environmental parameter via which each beam is to be transmitted. In some examples for the second apparatus, the feedback from the plurality of UEs may be received by the feedback component via separate CSI reports from the plurality of UEs.

According to some examples, the second apparatus may also include a digital display coupled to the processor circuit to present a user interface view.

In some examples, example second methods may include grouping, at an eNB capable of operating in compliance with one or more 3GPP LTE standards including LTE-A, a plurality of beams in beam sets. For these examples, each beam may be arranged to be transmitted from a plurality of antennas. The second methods may also include generating reference symbols for each beam set. The second methods may also include activating each beam set by precoding each beam in each beam set using the reference symbols for each beam set. The second methods may also include causing the reference symbols in an activated beam set to be transmitted via the precoded beams. The second methods may also include receiving feedback from a plurality of UEs that indicates which beam from each beam set has a highest channel gain as detected by each of the plurality of UEs. The second methods may also include selecting a number of UEs from among the plurality of UEs. The number of selected UEs may equal a total number of beam sets having the grouped beams. The second methods may also include creating a gain table having three or more rows to indicate strongest to weakest channel gains reported by respective selected UEs indicated in each column of the gain table. The first row to indicate strongest channel gain. The second methods may also include rejecting a first beam having a strongest channel gain for a given selected UE based on the first beam included in a second or third row of the gain table for any of the other selected UEs. The second methods may also include selecting a second beam having a next strongest channel gain for the given selected UE and forwarding data to the given selected UE which includes precoding weights set based on the selected second beam.

According to some examples, the first methods may also include assigning sequential index identifiers to each beam set and iteratively activating each beam set according to assigned sequential identifiers.

In some examples for the first methods, each beam set may be activated over a given number of consecutive sub-frames. The given number may be based on a system design or at least one environmental parameter via which each beam is to be transmitted.

According to some examples for the first methods, selecting the number of UEs may be based on the selected UEs indicating higher channel gains compared to non-selected UEs or the selected UEs selected based on a proportional-fair scheduling (PFS) scheme.

According to some examples for the first methods, the first beam may be included in the second or third row of the gain table for any of the other selected UEs indicates the first beam causes signal leakage that interferes with strongest channel gain beams for the other selected UEs.

In some examples for the first methods, the plurality of antennas may be included in a multi-user, full-dimension, multiple-in and multiple-output, (FD-MIMO) system supported by the eNB.

According to some examples for the first methods, the feedback from the plurality of UEs may be received via separate CSI reports from the plurality of UEs.

In some examples, an apparatus may include means for performing the example second methods. In some examples, an example second at least one machine readable medium may include a plurality of instructions that in response to being executed on a system for an eNB capable of operating in compliance with one or more 3GPP LTE standards including LTE-A may cause the system to group a plurality of beams in beam sets, each beam arranged to be transmitted from a plurality of antennas. The instructions may also cause the system to generate reference symbols for each beam set. The instructions may also cause the system to activate each beam set by precoding each beam in each beam set using the reference symbols for each beam set and cause the reference symbols in an activated beam set to be transmitted via the precoded beams. The instructions may also cause the system to receive feedback from a plurality of UEs that indicates which beam from each beam set has a highest channel gain as detected by each of the plurality of UEs. The instructions may also cause the system to select a number of UEs from among the plurality of UEs, the number of selected UEs to equal a total number of beam sets having the grouped beams. The instructions may also cause the system to select a beam from among the plurality of beams for a first selected UE based on the beam causing no interference to other beams from among the plurality of beams selected for other selected UEs that is above a given interference threshold. The instructions may also cause the system to forward data to the first selected UE that includes precoding weights set based on the selected beam.

According to some examples for the second at least one machine readable medium, the instructions may also cause the system to create a gain table having three or more rows to indicate strongest to weakest channel gains reported by respective selected UEs indicated in each column of the gain table, the first row to indicate strongest channel gain. The instructions may also cause the system to reject individual beams having a strongest channel gain for a given selected UE based on the strongest channel gain beam included in a second or third row of the gain table for any of the other selected UEs indicating interference above the given interference threshold.

In some examples for the second at least one machine readable medium, the rejected strongest channel gain beam may be included in the second or third row of the gain table for any of the other selected UEs to indicate the rejected strongest channel gain beam causes signal leakage that interferes with strongest channel gain beams for the other selected UEs.

In some examples for the second at least one machine readable medium, the instructions to also cause the system to assign sequential index identifiers to each beam set and iteratively activate each beam set according to assigned sequential identifiers.

According to some examples for the second at least one machine readable medium, the plurality of antennas may be included in a multi-user, FD-MIMO system supported by the eNB.

In some examples for the second at least one machine readable medium, the precode component may activate each beam set over a given number of consecutive sub-frames. The given number may be based on a system design or at least one environmental parameter via which each beam is to be transmitted.

According to some examples for the second at least one machine readable medium, the feedback from the plurality of UEs received by the feedback component via separate CSI reports from the plurality of UEs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine readable medium comprising a plurality of instructions that, in response to being executed at user equipment (UE) capable of operating in compliance with one or more $3^{rd}$ Generation Partnership Project (3GPP) Long Term Evolution (LTE) standards including LTE-Advanced (LTE-A), cause the UE to:
 receive a plurality of reference symbols from an evolved node B (eNB) via separate beams, each beam associated with one of a plurality of beam sets;
 select a beam from each beam set according to a defined parameter;
 report the selected beams to the eNB;
 receive precoding weights for a given beam of the reported beams from the eNB, the given beam selected from among the plurality of beams based on the given beam causing no interference to other beams from among the plurality of beams selected for other UEs that is above a given interference threshold; and
 receive data from the given beam using the precoding weights.

2. The at least one non-transitory machine readable medium of claim 1, comprising instructions that, in response to being executed at the UE, cause the UE to select the beam from each beam set based on the defined parameter comprising a highest channel gain.

3. The at least one non-transitory machine readable medium of claim 1, comprising instructions that, in response to being executed at the UE, cause the UE to report the selected beam to the eNB via transmission of a channel state information (CSI) report.

4. The at least one non-transitory machine readable medium of claim 1, the plurality of antennas included in a multi-user, full-dimension, multiple-in and multiple-output, (FD-MIMO) system supported by the eNB.

5. An apparatus, comprising:
 at least one memory; and
 logic for user equipment (UE) capable of operating in compliance with one or more $3^{rd}$ Generation Partnership Project (3GPP) Long Term Evolution (LTE) standards including LTE-Advanced (LTE-A), at least a portion of the logic in hardware coupled to the at least one memory, the logic to:
 receive a plurality of reference symbols transmitted from an evolved node B (eNB), each received reference symbol precoded by the eNB and transmitted through a plurality of antennas via separate beams, each beam associated with one of a plurality of beam sets;
 determine which beam has highest channel gain for each beam set;
 report information to the eNB to indicate respective highest channel gain beams for each beam set;
 receive data including precoding weights set based on a given beam selected by the eNB based on the reported highest channel gain beams, and;
 use the precoding weights to receive data via the given beam.

6. The apparatus of claim 5, the given beam selected from among the plurality of beams based on the given beam causing no interference to other beams from among the plurality of beams selected for other UEs that is above a given interference threshold.

7. The apparatus of claim 5, the logic to report information to the eNB by causing transmission of a channel state information (CSI) report to the eNB.

8. The apparatus of claim 5, the plurality of antennas included in a multi-user, full-dimension, multiple-in and multiple-output, (FD-MIMO) system supported by the eNB.

9. The apparatus of claim 5, comprising a digital display coupled to the logic to present a user interface view.

10. An apparatus, comprising:
 at least one memory; and
 logic for an evolved Node B (eNB) capable of operating in compliance with one or more $3^{rd}$ Generation Partnership Project (3GPP) Long Term Evolution (LTE) standards including LTE-Advanced (LTE-A), the eNB having a plurality of antennas, at least a portion of the logic in hardware coupled to the at least one memory, the logic to:
 group a plurality of beams in beam sets, each beam arranged to be transmitted from the plurality of antennas;
 generate reference symbols for each beam set;

activate each beam set by precoding each beam in each beam set using the reference symbols for each beam set;

cause the reference symbols in an activated beam set to be transmitted via the precoded beams;

receive feedback from a plurality of user equipment (UEs) that indicates which beam from each beam set has a highest channel gain as detected by each of the plurality of UEs;

select a number of UEs from among the plurality of UEs, the number of selected UEs to equal a total number of beam sets having the grouped beams;

select a beam from among the plurality of beams for a first selected UE based on the beam causing no interference to other beams from among the plurality of beams selected for other selected UEs that is above a given interference threshold; and forward data to the first selected UE that includes precoding weights set based on the selected beam.

11. The apparatus of claim 10, comprising the logic to:
create a gain table having three or more rows to indicate strongest to weakest channel gains reported by respective selected UEs indicated in each column of the gain table, the first row to indicate strongest channel gain; and
reject individual beams having a strongest channel gain for a given selected UE based on the strongest channel gain beam included in a second or third row of the gain table for any of the other selected UEs indicating interference above the given interference threshold.

12. The apparatus of claim 11, the rejected strongest channel gain beam included in the second or third row of the gain table for any of the other selected UEs to indicate the rejected strongest channel gain beam causes signal leakage that interferes with strongest channel gain beams for the other selected UEs.

13. The apparatus of claim 10, the logic to:
assign sequential index identifiers to each beam set; and
iteratively activate each beam set according to assigned sequential identifiers.

14. The apparatus of claim 10, the plurality of antennas included in a multi-user, full-dimension, multiple-in and multiple-output, (FD-MIMO) system supported by the eNB.

15. The apparatus of claim 10, the logic to activate each beam set over a given number of consecutive sub-frames, the given number based on a system design or at least one environmental parameter via which each beam is to be transmitted.

16. The apparatus of claim 10, the feedback from the plurality of UEs received via separate channel state information (CSI) reports from the plurality of UEs.

17. The apparatus of claim 10, comprising a digital display coupled to the logic to present a user interface view.

18. A computer-implemented method comprising:
grouping, at an evolved Node B (eNB) capable of operating in compliance with one or more 3$^{rd}$ Generation Partnership Project (3GPP) Long Term Evolution (LTE) standards including LTE-Advanced (LTE-A), a plurality of beams in beam sets, each beam arranged to be transmitted from a plurality of antennas;

generating reference symbols for each beam set;

activating each beam set by precoding each beam in each beam set using the reference symbols for each beam set;

causing the reference symbols in an activated beam set to be transmitted via the precoded beams;

receiving feedback from a plurality of user equipment (UEs) that indicates which beam from each beam set has a highest channel gain as detected by each of the plurality of UEs;

selecting a number of UEs from among the plurality of UEs, the number of selected UEs to equal a total number of beam sets having the grouped beams;

creating a gain table having three or more rows to indicate strongest to weakest channel gains reported by respective selected UEs indicated in each column of the gain table, the first row to indicate strongest channel gain;

rejecting a first beam having a strongest channel gain for a given selected UE based on the first beam included in a second or third row of the gain table for any of the other selected UEs;

selecting a second beam having a next strongest channel gain for the given selected UE; and forwarding data to the given selected UE which includes precoding weights set based on the selected second beam.

19. The computer-implemented method of claim 18, comprising:
assigning sequential index identifiers to each beam set; and
iteratively activating each beam set according to assigned sequential identifiers.

20. The computer-implemented method of claim 18, comprising activating each beam set over a given number of consecutive sub-frames, the given number based on a system design or at least one environmental parameter via which each beam is to be transmitted.

21. The computer-implemented method of claim 18, comprising selecting the number of UEs based the selected UEs indicating higher channel gains compared to non-selected UEs or the selected UEs selected based on a proportional-fair scheduling (PFS) scheme.

22. The computer-implemented method of claim 18, comprising the first beam included in the second or third row of the gain table for any of the other selected UEs indicates the first beam causes signal leakage that interferes with strongest channel gain beams for the other selected UEs.

23. The computer-implemented method of claim 18, comprising the plurality of antennas included in a multi-user, full-dimension, multiple-in and multiple-output, (FD-MIMO) system supported by the eNB.

24. The computer-implemented method of claim 18, comprising the feedback from the plurality of UEs received via separate channel state information (CSI) reports from the plurality of UEs.

* * * * *